(12) United States Patent
Drews et al.

(10) Patent No.: US 11,189,872 B2
(45) Date of Patent: Nov. 30, 2021

(54) MULTIFUNCTIONAL POUCH BATTERY CELL FRAME

(71) Applicant: FORD GLOBAL TECHNOLOGIES, LLC, Dearborn, MI (US)

(72) Inventors: Andrew Drews, Ann Arbor, MI (US); Brian Robert, St. Clair Shores, MI (US); Mohan Karulkar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 571 days.

(21) Appl. No.: 15/825,714

(22) Filed: Nov. 29, 2017

(65) Prior Publication Data

US 2018/0219191 A1    Aug. 2, 2018

Related U.S. Application Data

(63) Continuation-in-part of application No. 15/417,877, filed on Jan. 27, 2017, now Pat. No. 10,930,978.

(51) Int. Cl.
| | | |
|---|---|---|
| *H01M 50/124* | (2021.01) | |
| *H01M 50/116* | (2021.01) | |
| *H01M 50/70* | (2021.01) | |
| *H01M 10/0525* | (2010.01) | |

(52) U.S. Cl.
CPC ..... *H01M 50/124* (2021.01); *H01M 10/0525* (2013.01); *H01M 50/116* (2021.01); *H01M 50/70* (2021.01)

(58) Field of Classification Search
None
See application file for complete search history.

(56) References Cited

U.S. PATENT DOCUMENTS

| | | |
|---|---|---|
| 6,143,440 A | 11/2000 | Volz et al. |
| 6,296,967 B1 | 10/2001 | Jacobs et al. |
| 6,743,546 B1 | 6/2004 | Kaneda et al. |
| 8,518,569 B2 | 8/2013 | Murphy et al. |
| 9,023,503 B2 | 5/2015 | Seong et al. |
| 9,276,242 B2 | 3/2016 | Damon et al. |
| 9,379,365 B2 | 6/2016 | Schmieder et al. |
| 9,385,404 B2 | 7/2016 | Yoon et al. |
| 2006/0234119 A1 | 10/2006 | Kruger et al. |
| 2008/0171259 A1 | 7/2008 | Kanai et al. |
| 2011/0003185 A1 | 1/2011 | Kritzer |
| 2012/0107663 A1 | 5/2012 | Burgers et al. |
| 2013/0095352 A1 | 4/2013 | Yamauchi et al. |
| 2013/0122336 A1 | 5/2013 | Park et al. |
| 2013/0157099 A1 | 6/2013 | Anderson |

(Continued)

FOREIGN PATENT DOCUMENTS

| | | |
|---|---|---|
| CN | 102918615 A | 2/2013 |
| GB | 2537431 A | 10/2016 |

(Continued)

*Primary Examiner* — Tracy M Dove
(74) *Attorney, Agent, or Firm* — David B Kelley; Brooks Kushman P.C.

(57) ABSTRACT

A pouch battery cell includes a rigid frame forming a skeleton of the cell and defining an aperture, an anode, a separator, a cathode, and a thermal transfer device disposed within the aperture, the anode and cathode each including a current collector with an exposed tab portion bonded to a terminal, integrated into the frame, and the thermal transfer device integrated into the frame and partially extending to the cell exterior.

13 Claims, 10 Drawing Sheets

(56) References Cited

U.S. PATENT DOCUMENTS

| | | |
|---|---|---|
| 2013/0280596 A1 | 10/2013 | Lee et al. |
| 2014/0103880 A1 | 4/2014 | Schaefer et al. |
| 2014/0147712 A1 | 5/2014 | Lee |
| 2014/0248515 A1 | 9/2014 | Wayne et al. |
| 2015/0037662 A1 | 2/2015 | Pinon et al. |
| 2015/0171411 A1 | 6/2015 | Kobayashi et al. |
| 2015/0270516 A1 | 9/2015 | Mcleskey et al. |
| 2016/0036024 A1 | 2/2016 | Choi |
| 2016/0093857 A1 | 3/2016 | DeKeuster et al. |
| 2016/0204398 A1 | 7/2016 | Moon et al. |
| 2016/0248135 A1 | 8/2016 | Kim et al. |
| 2016/0254504 A1 | 9/2016 | Kim et al. |
| 2016/0293926 A1 | 10/2016 | Yamada |
| 2017/0317324 A1 | 11/2017 | Westermeier et al. |
| 2019/0067659 A1 | 2/2019 | Karulkar et al. |

FOREIGN PATENT DOCUMENTS

| | | |
|---|---|---|
| KR | 20150089588 A | 8/2015 |
| WO | 2016083144 A1 | 6/2016 |

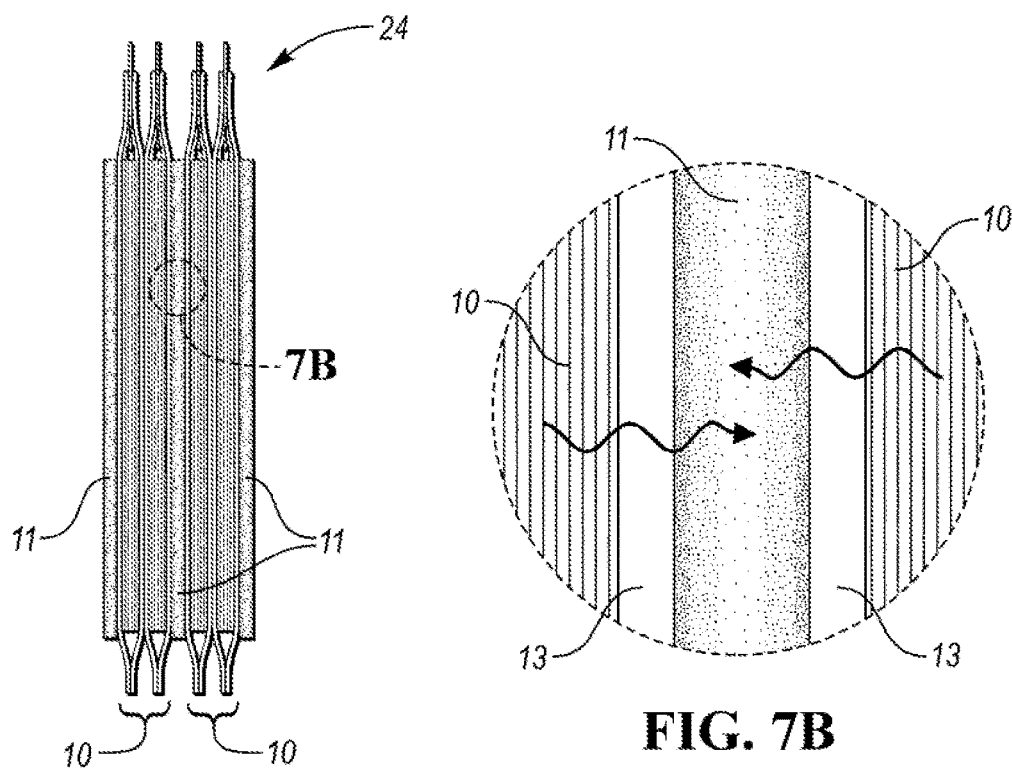
FIG. 7A
*(PRIOR ART)*
FIG. 7B
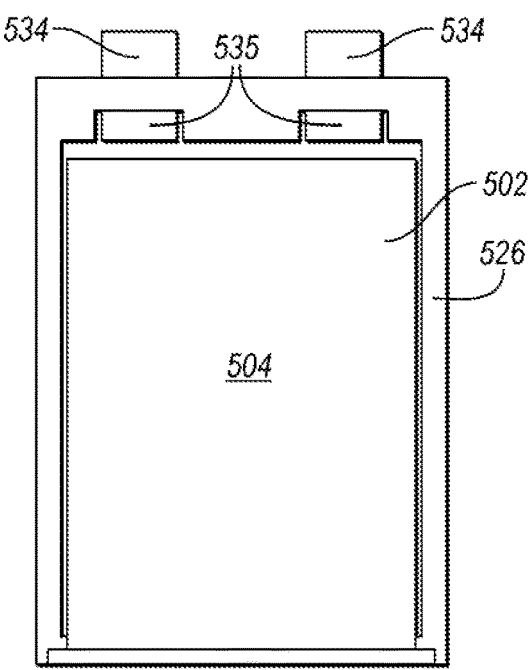
FIG. 8A
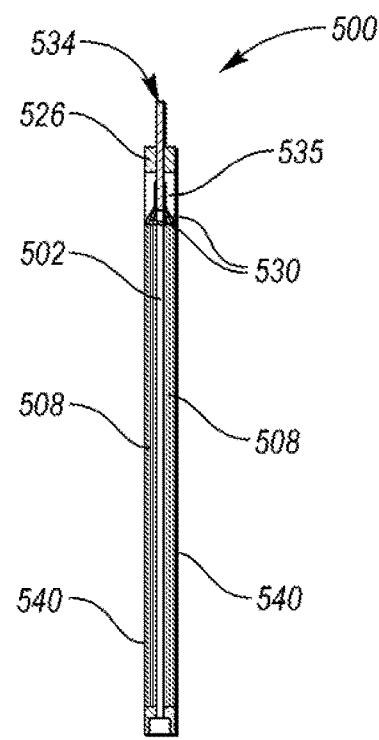
FIG. 8B

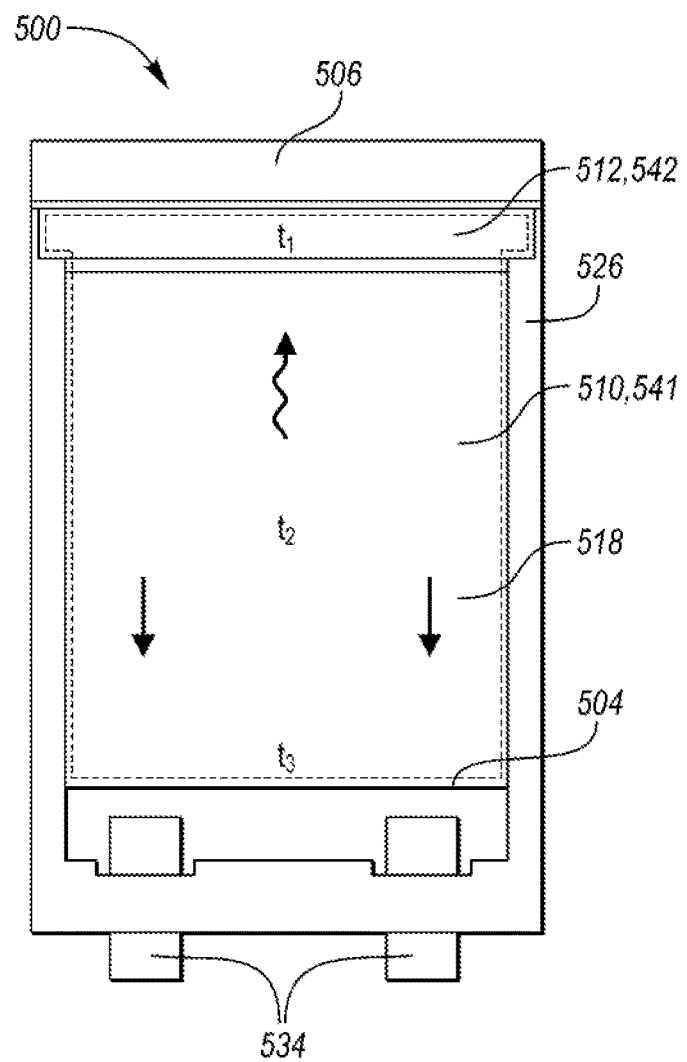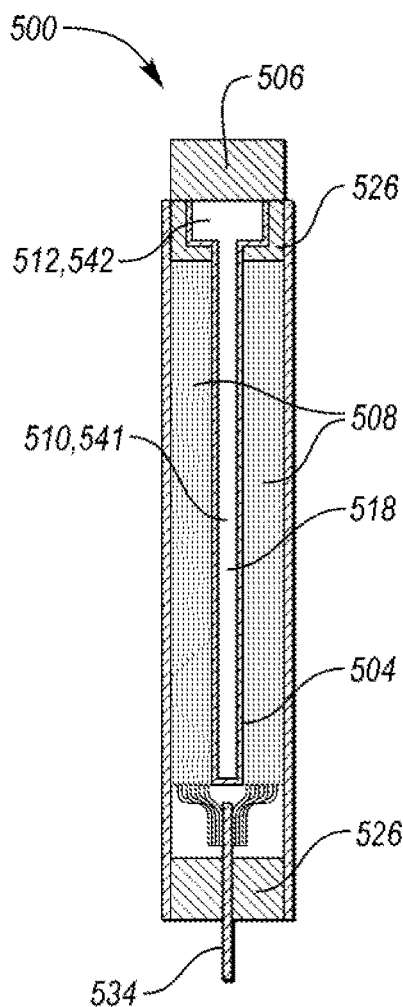
FIG. 13A  FIG. 13B

MULTIFUNCTIONAL POUCH BATTERY CELL FRAME

CROSS-REFERENCE TO RELATED APPLICATIONS

This application is a continuation-in-part of U.S. application Ser. No. 15/417,877 filed Jan. 27, 2017, now U.S. Pat. No. 10,930,978, issued on Feb. 23, 2021, the disclosure of which is hereby incorporated in its entirety by reference herein.

TECHNICAL FIELD

This disclosure relates to pouch battery cells, corresponding cell frames, and methods of producing the same.

BACKGROUND

Lithium ion pouch cells have been utilized in a variety of industries including automotive applications. The pouch cell designs are attractive due to their reduced weight and cost as well as optimized packaging efficiency at the battery level, higher specific density, and higher voltage output per cell than many other systems. Thus, lithium ion pouch cells have become the primary choice for many applications that require high specific and volumetric energy density such as automotive cells for electric vehicles and smart phones.

SUMMARY

In at least one embodiment, a pouch battery cell is disclosed. The battery cell includes a rigid frame forming a skeleton of the cell and defining an aperture. The battery cell further includes an anode, a separator, a cathode, and a thermal transfer device disposed within the aperture, the anode and cathode each including a current collector with an exposed tab portion bonded to a terminal, integrated into the frame. The thermal transfer device is integrated into the frame and partially extends to the cell exterior. The thermal transfer device may be a thermally conductive plate. The thermal transfer device may include a first portion situated within the aperture and a second portion integrated into frame and having an exposed surface facing towards an exterior of the frame. The exposed surface of the second portion may be arranged to be in physical contact with an external heat exchanger. The cell may further include an external heat exchanger adjacent to the thermal transfer device, the external heat exchanger arranged on the opposite side of the frame than the terminals. The heat exchanger may include a convective cooling feature. An electrically insulating layer may be arranged between the external heat exchanger and the thermal transfer device.

In an alternative embodiment, a pouch battery cell is disclosed. The battery cell includes a rigid frame forming a skeleton of the cell, including a pair of terminals, and defining an aperture. The battery cell further includes a first and second electrode sandwiches, each including an anode, a separator, and a cathode, arranged in the aperture such that the anode and cathode, each including a current collector, are integrated into the frame via bonds between the current collectors and terminals. The battery cell further includes a thermal transfer device integrated into the frame and partially extending to the cell exterior. The thermal transfer device may be arranged between the first and second electrode sandwiches. The thermal transfer device may be a thermally conductive plate. The thermal transfer device may include a first portion situated within the aperture and a second portion integrated into the frame and having an exposed surface facing towards an exterior of the frame. The exposed surface of the second portion may be arranged to be in physical contact with an external heat exchanger. The cell may interface with a heat exchanger adjacent to the thermal transfer device. The heat exchanger may include a convective cooling feature. An electrically insulating layer may be arranged between the heat exchanger and the thermal transfer device.

In a yet alternative embodiment, a pouch battery cell is disclosed. The battery cell includes a rigid frame forming a skeleton of the cell, including a pair of terminals, and defining an aperture. The battery cell further includes a first and second electrode sandwiches, each including an anode, a separator, and a cathode, arranged in the aperture such that the anode and cathode, each including a current collector, are integrated into the frame via bonds between the current collectors and terminals. The battery cell also includes a thermal transfer device, including at least one hollow portion, integrated into the frame and partially extending to the cell exterior. The at least one hollow portion may include a channel extending throughout the thermal transfer device, the channel being capable of transporting a fluid from an inlet to an outlet. The inlet and outlet may be incorporated into the frame. The at least one hollow portion may include an internal chamber, arranged in the aperture, connected to a condenser chamber, arranged in the frame. The internal chamber may include a liquid and vapor in equilibrium with the liquid.

BRIEF DESCRIPTION OF THE DRAWINGS

FIG. 7A shows a prior art cell stack with cooling plates adjacent to individual cells;

FIG. 7B shows a detailed view of a portion of FIG. 7A;

FIG. 8A shows a top view of an example embodiment of a cell having a frame incorporating a thermal transfer device;

FIG. 8B is a cross-sectional view of FIG. 8A;

FIG. 13A depicts a top view of an alternative example cell having a frame incorporating a thermal transfer device with a cavity; and FIG. 13B shows a cross-section view of FIG. 13A.

DETAILED DESCRIPTION

Figure 1A:
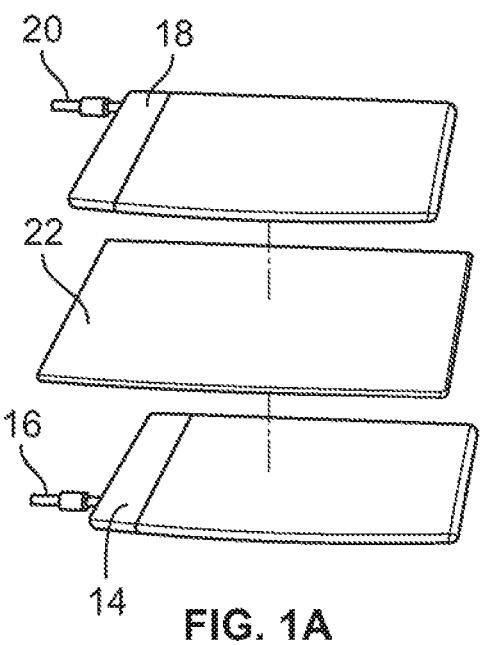
FIG. 1A depicts an exploded view of individual layers within a prior art pouch cell battery depicted in FIG. 1B.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

With mass-production of batteries, a variety of battery formats have been developed. Example battery formats include cylindrical cells, button cells, prismatic cells, and pouch cells. The pouch cell design represents an efficient use of space and achieves about 90-95% packaging efficiency. Instead of using a metallic cylinder and glass-to-metal electrical feed-through, conductive foil tabs are typically welded to the electrodes and are fully sealed while extending outside of the pouch. By eliminating a metal enclosure, the weight of the pouch cell is reduced.

While a pouch cell is a lightweight solution to the battery design, the pouch format presents a number of considerations such as requirement for support and space to expand. Additional concerns are exposure to humidity and high temperatures which may shorten life of the cell. Swelling represents yet another concern, for example swelling by up to 8-10% over 500 cycles may be typical with some types of pouch cells. Yet, pouch cells have become popular, especially in the same performance criteria as cylindrical cells. Pouch cells have been successfully utilized in consumer, military, as well as automotive applications. Relatively large flat pouch cell packs have been applied in electric powertrains and Energy Storage Systems. Relatively small pouch cells have been used for portable applications with high load current requirements.

Lithium ion pouch cells thus represent a pouch made from a solvent- and gas-impermeable membrane in a clamshell construction. In its simplest version, two pieces of membrane are typically heat-sealed together on three sides to form a pocket for the cell contents, filled with electrolyte and sealed on the fourth edge to enclose the cell and electrolyte. In the initial sealing operation, electrical contacts to the cell are typically provided by using thin metallic terminals welded to the current collectors of the cell electrodes that protrude through the membrane sealing region, and the pouch material is heat-sealed around the terminals.

Figure 1B:
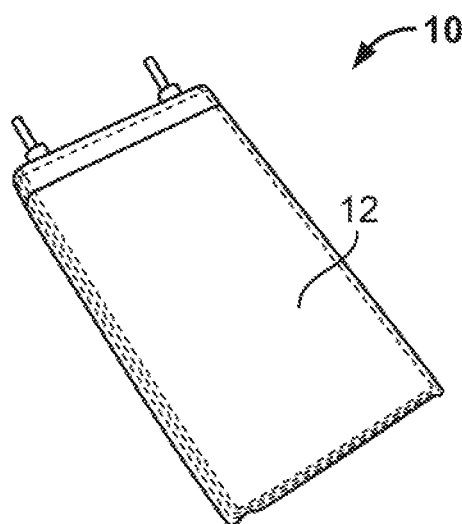
FIG. 1B depicts a perspective view of an example pouch cell battery.

An example prior art lithium-ion pouch cell 10 is depicted in FIGS. 1A and 1B. As can be seen in FIGS. 1A and 1B, a pouch cell 10 has a laminated architecture in a pouch 12. The pouch 12 includes a cathode 14 with a battery tab or terminal 16, an anode 18 with a battery tab or terminal 20, and a separator 22 sandwiched between the cathode 14 and the anode 18. After the laminated layers 14, 18, 22 are assembled together and inserted into the pouch 12, the pouch 12 is filled with electrolyte and subsequently sealed in such a way that the tabs 16 and 20 are outside of the pouch 12.

To improve the robustness of the seals around the electrical terminals, a thin coating of hot-melt polymer is typically applied to the terminals in a separate, preliminary operation. During seam sealing, the pouch material is melted into the added sealing material. Although packaging in pouches is an inexpensive and easy method from a manufacturing perspective, this method for cell packaging suffers from several drawbacks.

Firstly, despite the use of a hot-melt coating on the terminals, it is difficult to achieve sufficient sealing around the terminals without suffering occasional leaks. This is primarily due to the need to melt the opposing pouch membranes and the terminal sealing material completely around the edges of the terminals to achieve a continuous seal. Sealing across any discontinuities introduces the possibility of incomplete "knitting" of the polymer from the two opposing membranes. While pre-coated tabs have been developed to address this problem, the method adds manufacturing operations and complexity as the pre-coated area of the terminals must be carefully positioned during the welding operation to ensure that the sealing surface is correctly aligned in the sealing region.

A second disadvantage of current pouch cell manufacturing processes is that the pouch must be "pre-formed" to produce a pocket to accommodate the thickness of the cell. This is needed to avoid significant distortion and wrinkling of a membrane when the cell is vacuum-sealed between the two membranes, which can lead to leaks. Pre-forming is accomplished by cold- or vacuum-forming a sheet of the pouch material over a form that mimics the shape of the cell contents. This process stretches the membrane and can lead to thin spots or breaks in the layers of the pouch material that are incorporated to limit gas permeation. As a result, significant cost is added to the pouch material to ensure lack of breaks in the permeation-limiting-layers during preforming. Yet, most of the pouch remains flat and is not deformed. Since there is no easy or inexpensive way to position a region of the gas permeation barrier, which is thicker to accommodate distortion during the preforming operation, the permeation-limiting-layers must be over-designed with respect to the needed performance for most of the area of the pouch.

An additional disadvantage lies in the fact that the sealed edges of a pouch cell offer little protection against mechanical damage to the vulnerable edges of the cell. Because the pouch material is necessarily thin, it has little mechanical strength and cannot offer significant resistance to edge-on impacts to the cell. In present methods of the lithium ion pouch assembly, the pouch cells are loaded into alignment slots, using their seams to align the cells. But the cell alignment guides must allow for easy insertion into the modules during assembly, and thus may not fully constrain the cells, leaving the cells vulnerable to abrasion and damage from vibration during vehicle use.

Additionally, the pouch cells may not generally include a dedicated gas vent which could release gasses formed by reactions between the electrolyte solvent and the active materials. Pouch cells are usually constrained between pressure plates to ensure that an increase of internal pressure caused by gas generation puts the greatest stress on the seams and creates slower gas release in a fault condition. Yet, experience from cell testing suggests that the gas release does not occur in a predictable manner at consistent pressures or locations.

Additionally still, flexible pouch materials generally have poor thermal conduction. Thermal management is thus typically required to enable long cell life and to prevent initiation of undesirable side-reactions that could potentially lead to the battery failure. In one common approach to thermal management, pouch cells are provided with metallic cooling plates between alternate pouch cells. But thermal conduction between the cell contents and the cooling plates is through an interface between the cell interior and the pouch material, through the pouch material itself, and then through a pouch material-cooling plate interface. It is typically found that thermal interfaces add significant thermal resistance to the conduction process, especially for dissimilar materials.

Alternatively, thermal management may be provided by convective exchange of heat with air flowing over the cells, while in other cases, conduction of heat into or out of cells may be provided by external heat exchanger plates that incorporate flowing fluids. In both cases, heat must be conducted from inside the cell through any packaging to the exterior surfaces. While either of these techniques may be satisfactory for removing heat generated within portions of the cells near their exterior, the inner portions experience higher temperatures due to the longer conduction pathway. In addition, for pouch cells, the packaging materials are typically a polymer composite sheet that is a poor thermal conductor. In this case, cooling plates placed between cells may be hampered in their ability to remove heat. Although simpler from a system perspective, air cooling requires significant air flow over the surfaces of the cells to effectively remove heat. To accomplish efficient air cooling, gaps between cells may be provided. Yet, these gaps are larger than the space required for a liquid cooling plate, thus increasing the packaging volume, which is not desirable. Thus, a more efficient system for removing heat from the interior of a cell body would be advantageous to improve the overall system complexity and cooling efficiency.

Lastly, pouch cells do not typically provide a suitable support structure to allow for robust incorporation of additional features such as sensors, feedthroughs, and/or electronic devices. The versatility to provide additional functionality to the cell as a unit is thus limited. Likewise, the pouch cell capability to interface with other devices is limited.

To overcome the problems mentioned above, a lithium ion pouch cell battery 100 is disclosed. In one or more embodiments, depicted, for example, in FIG. 2A, the pouch cell battery 100 includes a frame (not depicted) forming a skeleton of the cell 100. An example frame is depicted in FIGS. 3A-3E. The frame 126 defines an aperture 128. The aperture 128 is designed to accommodate the anode 118, the cathode 144, and the separator 112 located between the anode 118 and the cathode 114, as depicted in FIG. 2B. As FIG. 2A further illustrates, the pouch cell 100 includes a sheet arranged as the cell cover 140, enclosing the frame within the cell 100.

The frame 126, as illustrated in FIGS. 3A-3E, may be a rigid frame 126. The frame 126 may extend around the entire periphery of a pouch cell 100. The frame 126 may also extend only alongside a portion or a plurality of portions of the periphery of the pouch cell 100. The frame 126 may form a boundary between the inside and outside of a battery cell 100. The frame 126 may capture, hold, enclose and/or seal the anode, cathode, and separator within the aperture 128. The frame 126 thus provides protection from mechanical stresses to the anode, cathode, and separator which the cell 100 may be exposed to.

The frame 126 may be hollow or solid. The frame 126 may have a uniform or varying dimensions such as thickness. The frame 126 may be formed from any suitable electrically non-conducting material. The material should be substantially unreactive with the battery cell's electrolyte. The frame 126 may be made from one or more polymeric materials, ceramic, glass, or a combination thereof. The material may be a composite material. The material may be reinforced with fibers, glass, or other material. The polymeric material may be a non-polar polymer. The polymeric material may be thermoset or thermoplastic. The polymeric material may be a polyolefin such as polypropylene (PP), low-density or high-density polyethylene (LDPE, HDPE), polyimide (PI), the like, or a combination thereof.

The polymeric material may contain additives altering properties of the material. For example, the polymeric material may include one or more fillers, plasticizers, colorants improving thermal conductivity of the frame 126 and thus heat dissipation, maintaining relatively low electrical conductivity, increasing resistance to UV light, increasing mechanical strength, resistance to deformation at temperature extremes, the like, or a combination thereof.

Figure 3A:
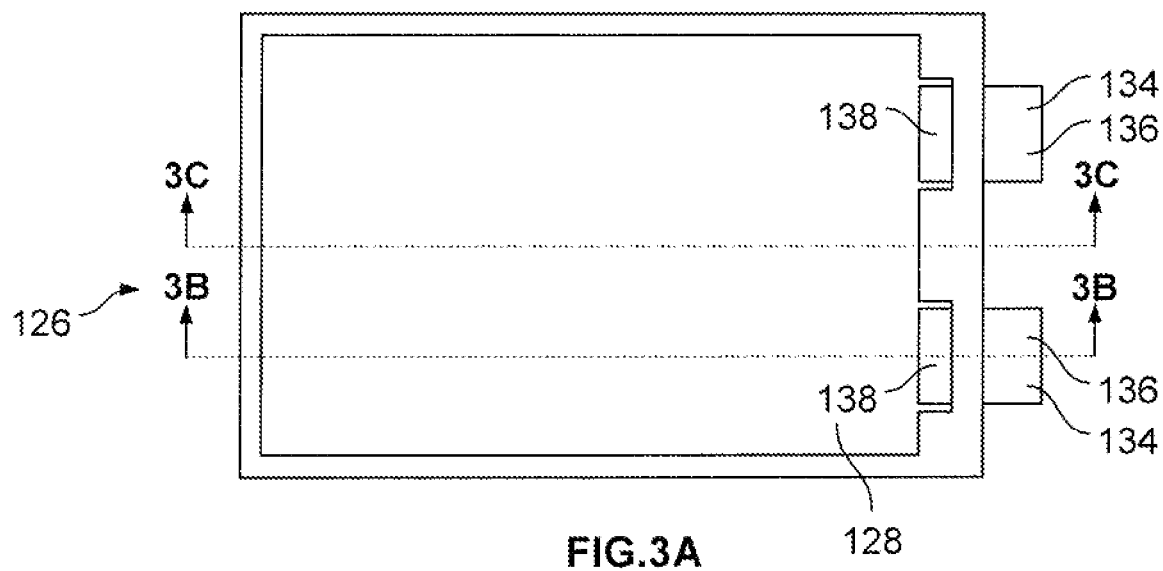
FIG. 3A depicts a top view of an example frame of the battery cell according to one or more embodiments.
Figure 3B:
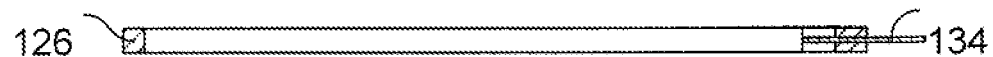
FIGS. 3B and 3C are cross-sectional views of the frame depicted in FIG. 3A along the lines 3B-3B and 3C-3C, respectively.
Figure 3C:
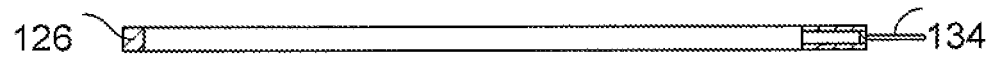
Figure 3D:
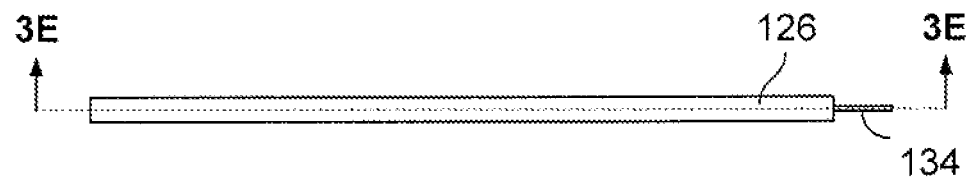
FIG. 3D illustrates a side view of the frame depicted in FIG. 3A.
Figure 3E:
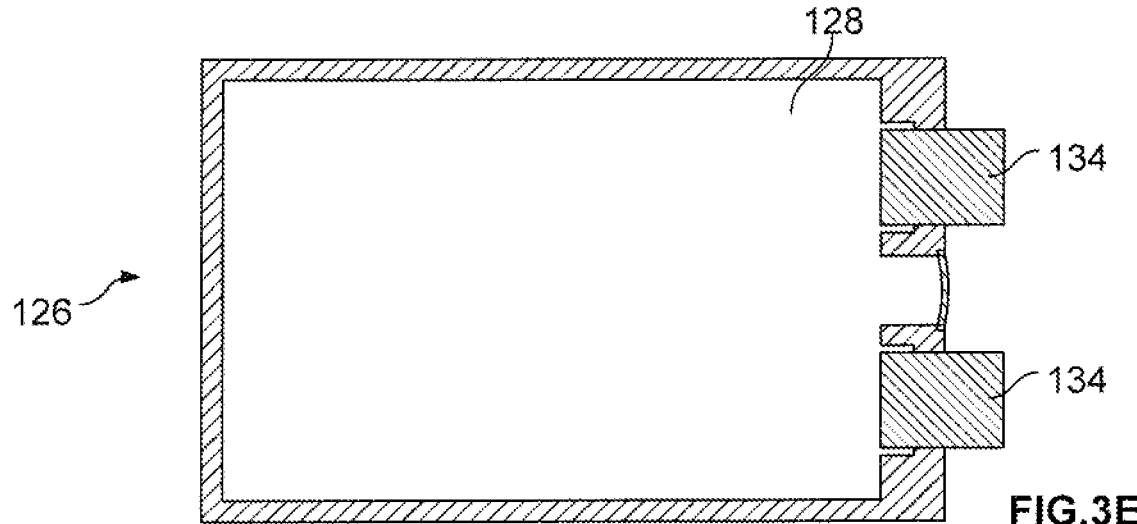
FIG. 3E shows a cross-sectional view of the frame depicted in FIG. 3D along the line 3E-3E.
Figure 3F:
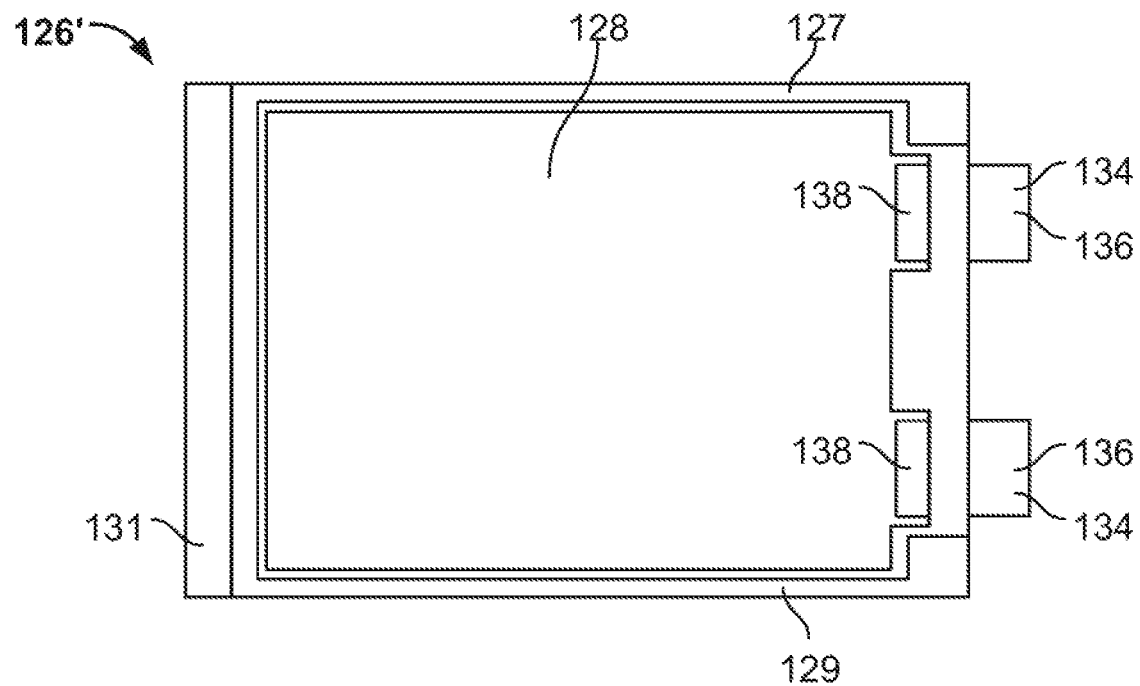
FIG. 3F shows a top view of an alternative example of the frame.

The entire frame 126 may be formed from one type of material. Alternatively, as is illustrated in FIG. 3F, at least a portion of the frame 126' may be made from a different material than the rest of the frame 126'. For example, the frame 126' may include an inward electrically non-conductive portion 127 surrounding the aperture 128, and an outward thermally-conductive portion 129 surrounding the inward portion 127. In such an embodiment, the terminals 134 are free from contact with the outward portion 129. The conductive portion 129 may be in contact with an external heat exchanger 131. Such embodiment provides enhanced thermal transfer due to presence of the conductive material. Yet, at the same time, the terminals 134 are insulated from the conductive portion 129 of the frame 126'. The electrically non-conductive portion 127 may be made from one or more materials identified above such as various plastics. The conductive portion 129 may be made from one or more metals such as aluminum, copper, magnesium, nickel, zinc, the like, or a non-metal material having a desirable thermal conductivity, or a combination thereof.

Figure 2A:
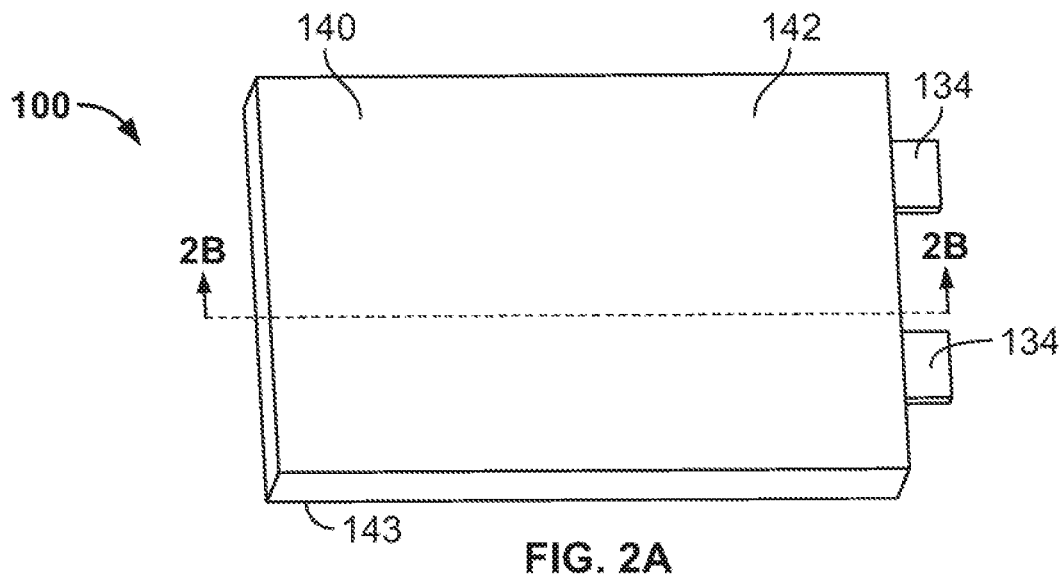
FIG. 2A depicts a perspective view of an example battery cell according to one or more embodiments.
Figure 2B:
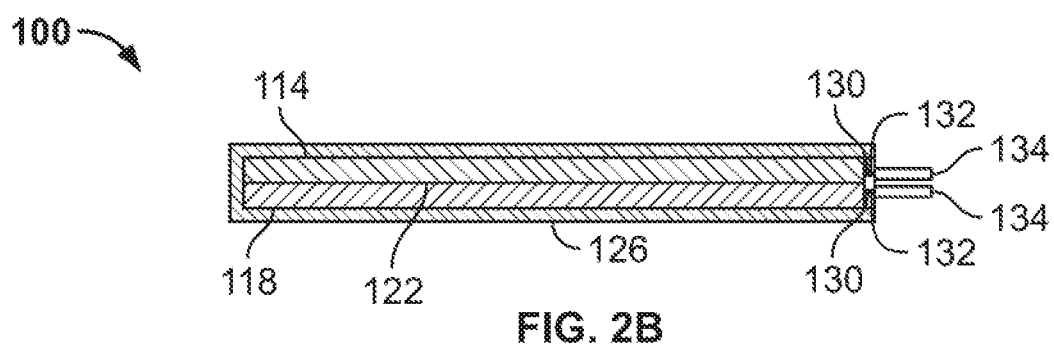
FIG. 2B shows a cross-sectional view of the battery cell depicted in FIG. 2A along the line 2B-2B.

The frame 126 may be covered by the cell cover 140, an example of which is depicted in FIG. 2A. The cell cover 140 may thus hold the cathode, the anode, the separator, the electrolyte, and the frame 126. The cell cover 140 may be arranged around the frame 126 in a tight or loose manner. The entire frame 126 or a portion of the frame 126 may be covered with the cell cover 140. The cell cover 140 thus envelops at least a portion of the frame 126.

The cell cover 140 may be flexible. The cell cover 140 may be semi-rigid. The cell cover 140 may be rigid. The cell cover 140 may be more flexible than the frame 126. While the periphery of the cell 100 is rigid due to the inclusion of the frame 126 within the cell cover 140, the faces of the cell, or the top portion 142 and the bottom portion 143, may remain flexible due to absence of a rigid structure within the aperture 128. The cell cover 140 may be flat such that the cell cover 140 lays flat against the frame structure 126. Alternatively, the cell cover 140 may include at least one raised portion. The cell cover 140 may be adhered to the frame 126 to complete the enclosure for the cell 100.

The cell cover 140 may be made from a polymeric material. The cell cover 140 may be a flexible sheet. The cell cover 140 may be made from a thermoplastic film. The cell cover 140 may be made from polyethylene (PE), polyester, imide, ketone, fluoropolymer, sulfone-based polymer, a resin, or a combination thereof. The cell cover 140 may be made from a bioplastic, and/or a biodegradable material. The cell cover 140 may be a monolayer or alternatively include a plurality of layers. The sheet may be laminated and include a metal foil as an intermediate layer sandwiched between polymeric materials. The cell cover 140 may be a co-extruded film. The thickness of the cell cover 140 may be from about 80 to 200 μm, 100 to 180 μm, 120 to 150 μm.

A variety of features may be incorporated into the frame 126 structure. For example, as can be seen in FIGS. 3A-3F, a pair of terminals 134 may be integrated into the frame 126. Each terminal 134 may have an exterior portion 136 and an interior portion 138. The interior portion 138 may be bonded to a current collector 130, depicted in FIG. 2B, of an anode 118 or cathode 114 and/or to an exposed tab portion 132 of the current collector 130. The exterior portion 136 may protrude outside of the frame 126. Alternatively, the exterior portion 136 may be flush with the periphery of the frame 126.

The pair of terminals 134 may be molded into the frame 126 structure. Alternatively, the frame 126 may be formed without the terminals 134 which may be inserted within the frame 126 later. Yet, it is advantageous to form the pair of terminals 134 as an integral portion the frame 126 such that there is a hermetic seal between the terminals 134 and the frame structure 126. The terminals 134 are electrical current carrying tabs. The terminals 134 provide electrical communication between the cell interior and the cell exterior.

The terminals 134 integrated into the frame 126 and the current collectors 130 of the electrodes are made from metal. Both terminals 134 may be made from the same or different metal. The terminal 134 may be made from the same metal as the current collector 130 the terminal is attached to. For example, the metal may be copper, aluminum, etc.

Figure 4A:
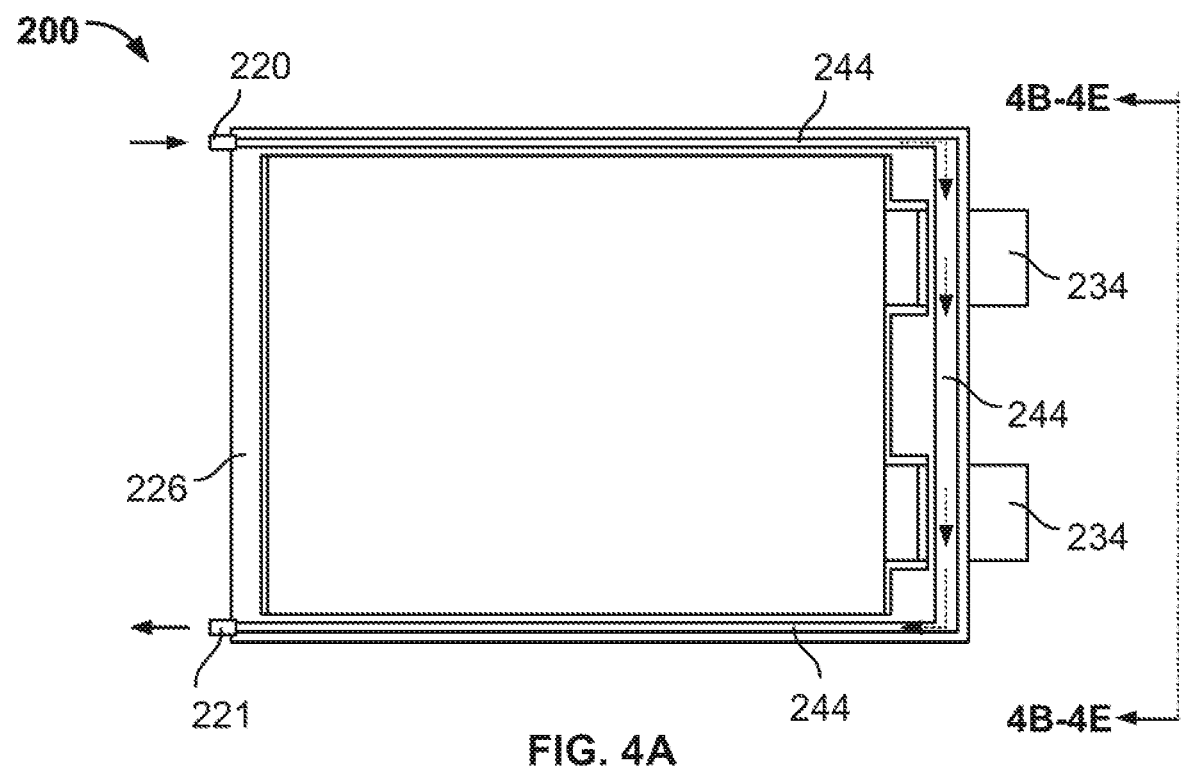
FIG. 4A shows a top view of an alternative example of the frame with channel portions.
Figure 4B:
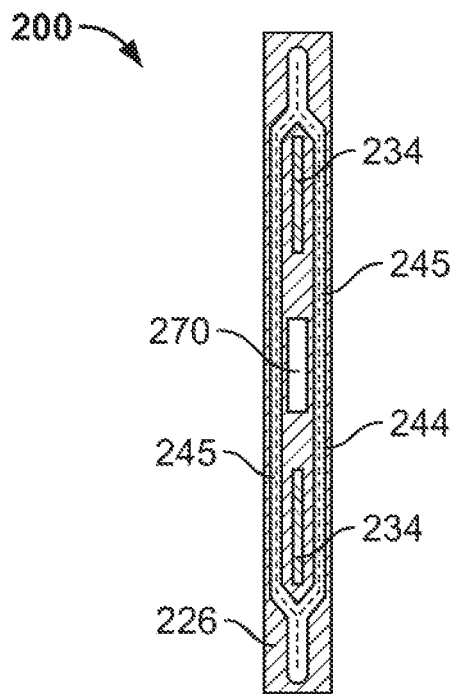
FIGS. 4B-4E show cross-sectional views of different examples of routing of a channel portion of the frame depicted in FIG. 4A along the line 4B-4E.
Figure 4C:
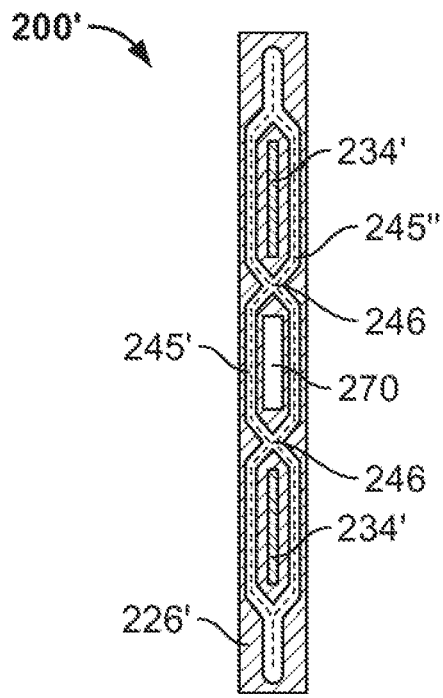
Figure 4D:
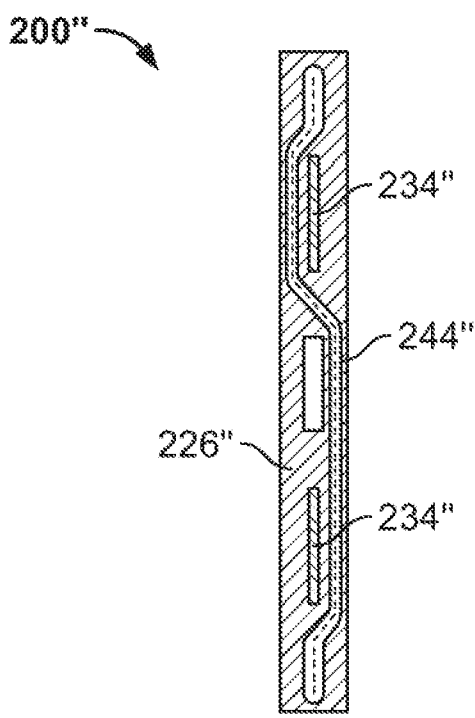
Figure 4E:
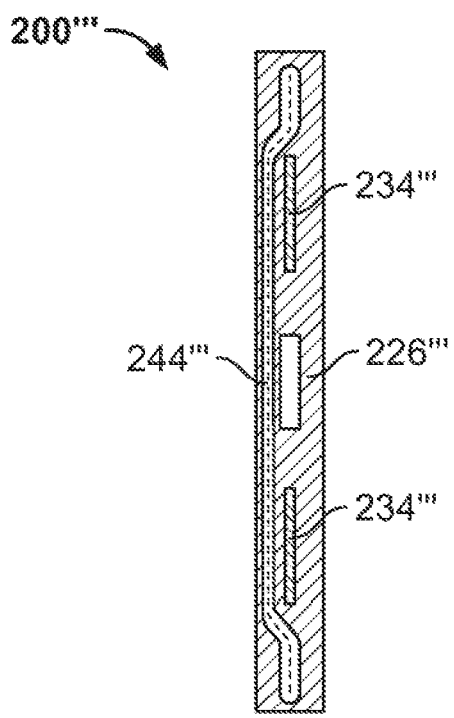

Among other features which may be incorporated into the frame are one or more channels. In an embodiment depicted in FIGS. 4A-4E, the frame 226 of the cell 200 may be produced in such a way that one or more internal passages 244 run through the frame 226. The passages or channels 244 may be included on one or more sides of the frame 226. All sides of the frame may include the channels 244. The channels 244 may be arranged along a periphery of the frame 226. The channels 244 may have uniform or varying dimensions. The channels 244 may be bifurcated, as is depicted in FIGS. 4B and 4C. The bifurcated channel 244 has two branches 245, each branch 245 running alongside different side of the terminals 234. The branches 245 may be routed in a variety of ways. For example, in an embodiment depicted in FIG. 4C, one branch 245' may run on the left side of the terminals 234' and connect with a second branch 245' running on the right side of the terminals 234' in at least two points of contact 246. Alternatively still, in an embodiment shown in FIG. 4D, a channel 244" may be routed along one side of the first terminal 234" and then along the opposite, second side of the second terminal 234". Yet, in at least one additional embodiment, depicted in FIG. 4E, the entire length of the channel 244''' may run alongside the same side of the terminals 234'''.

The channel 244 may be enclosed within the frame 226. The channel 244 may have one or more portions 244. At least one of the channel portions 244 may be in contact with the exterior of the cell through an inlet 220 or outlet 221. For example, in FIG. 4A, one of the three depicted channel portions 244 is in contact with a fluid entering the channels 244, the fluid originating outside of the cell 200. The arrows indicate the direction of the fluid moving within the channel portions 244. The fluid may be any fluid causing a desirable change in temperature within the cell 200 or a stack of cells. The fluid may be a coolant such as air, oxygen, water, or another liquid coolant. Alternatively, the fluid may provide heat to the cell 100. Alternatively still, the channel portions 244 may serve for both heating and cooling.

Figure 5:
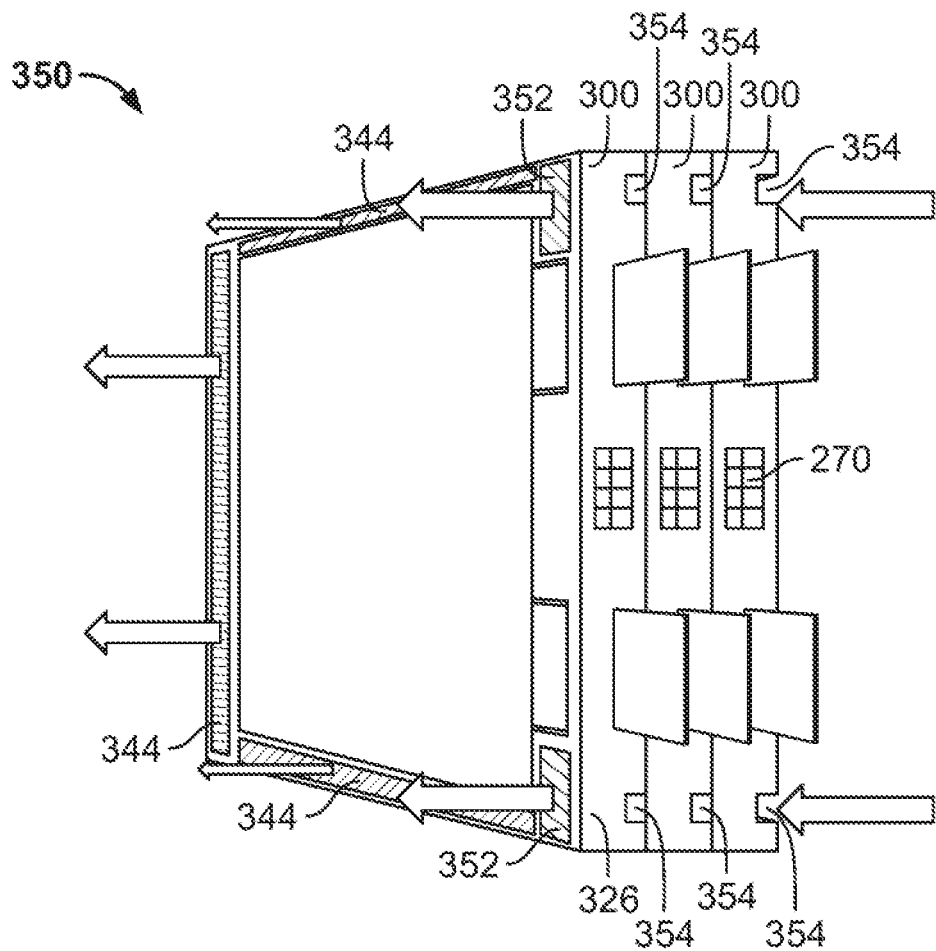
FIG. 5 shows a perspective view of a battery cell stack

The one or more channels may provide fluid flow contained within the frame structure of one cell. Alternatively, as is depicted in FIG. 5, the one or more channels may provide fluid flow between adjacent frames, external cooling devices, the like, or a combination thereof. In FIG. 5, three adjacent cells 300 are aligned and interlocked next to each other to form a single unit or a battery pack 350. Each frame 326 includes one or more channel portions 344 integrated within a single frame 326. In addition, common fluid channels 352 run through the adjacent cells 300. The common channels 352 may be multiple. Alternatively, a single common channel may be present in the batter pack 350. At least one of the common channel 352 may be in contact with at least one of the channel portions 344 of at least one of the cells 300.

An additional feature incorporated within the frame may be one or more openings 270, an example of which is depicted in FIGS. 4B-4E and also in FIG. 5. The opening 270 may serve as a vent for release of gas pressure accumulated within the cell. The vent may be configured for one-time action in the event of a dangerous build-up of gas pressure in the cell. Alternatively, an opening 270 may serve as a fill port for supplying electrolyte into the cell. The opening 270 may be sealable. The seal may be permanent or temporary. The opening 270 may serve more than one function or purpose. For example, the opening may serve as the vent and a fill port. In such an embodiment, the opening 270 may allow for electrolyte filling of the cell after which the same opening 270 may be provided with a gas release port. The gas release port may include a gas release mechanism such as a burst disk. The opening 270 may include one or more membranes arranged as the seal. The membrane may be a metallic or polymeric film.

In one or more embodiments, a plurality of cells may be connected to form a battery cell pack. The cell pack may include one to several hundred cells. Example battery cell pack 350 is depicted in FIG. 5. In FIG. 5, the frame 326 may include features 354 that allow adjacent cells 300 within the battery pack 350 to interconnect and thus form a single unit. The features 354 may be interlocking and/or alignment features. The alignment features ensure proper alignment of the individual cells 300 and their features such as the common channel 352 or channel portions 344, and/or ensure proper alignment of the cells 300 within a structure external to the cells 300. The alignment features may provide for interlocking of the cells 300 in the battery pack 350. Alternatively, in cases where the alignment features allow for more precise integration of the cells 300 into an external structure, the features 354 may also enable interfacing of the features, either between the cells 300 or with external structures. The same feature 354 may ensure alignment as well as provide interlocking. The features 354 may include male and female counterparts capable of coupling one frame 326 to another frame 326. The features 354 may include screws, bolts, locking clips, tabs, notches, grooves, protrusions, or projections. At least a first feature 354 may form a portion of one side of the first frame while a counterpart second feature 354 fitting in or connecting with the first feature 354 may be located on one side of the second frame facing the one side of the first frame.

The external structures mentioned above may be electronic communication and/or sensing devices, a temperature sensor, a strain sensor, a threshold value detector, a voltage detector, a current detector, a sensor providing a signal to a conditioning device, a logical computing device, communication devices or passages to house any of the sensors, feedthroughs or electronic devices, the like, or a combination thereof.

Figure 6:
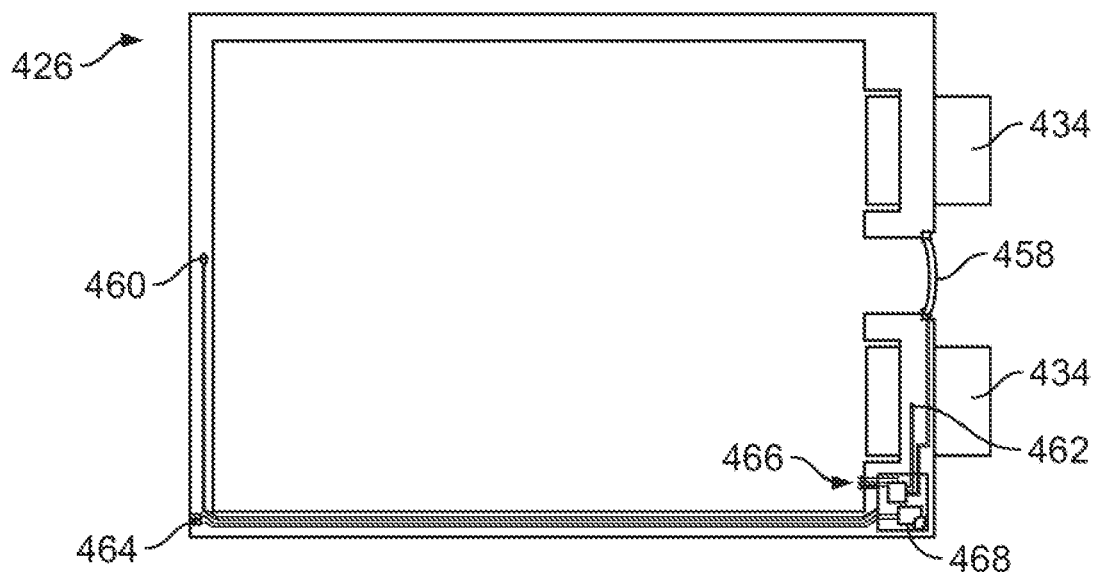
FIG. 6 illustrates a top view of an alternative embodiment of a frame with example electronic devices incorporated within the frame.

In one or more embodiments, one or more electronic devices may be incorporated into the frame structure. The electronic devices may enable sensing and/or communication with external devices such as Battery Electric Control Module (BECM) to report on the state of health of the cell. An example frame 426 with built-in electronic communication devices is depicted in FIG. 6. The frame 426 features a vent sensor 458, an embedded sensor 460, a temperature sensor 462, an external device interface 464, an internal sensor feedthrough 466, and a signal conditioning and communication circuit 468. Other devices such as a voltage sensor or a detector such as voltage, current, temperature, strain, damage threshold detector may be included. The feedthrough devices may provide a connection to sensor internal to the cell.

Sensors that require signal conditioning may provide signals to a conditioning device, such as an amplifier, a microcontroller, or a Field-Programmable Gate Array (FPGA). In some embodiments, signals from each cell may be transmitted to an external monitor system through wired connections, through fiber-optic connection, through transmission of radio wave signals (e.g., WiFi or Bluetooth), or any suitable means. In other embodiments, the status of the cell may be displayed at the cell itself through the use of a visual indicator such as an LED light.

As was stated above, prior art methods of cooling pouch cells include cooling with air or providing a liquid flow cooling plates sandwiched externally between alternate cells of a cell stack. Yet, to increase cell energy density and reduce cost, pouch cells of greater dimensions are being produced, for example pouch cells having up to about five times the capacity of the current pouch cells. As the pouch cells get larger, thermal resistance may reduce effectiveness of the external liquid flow cooling plates. An example of prior art pouch cells 10 with externally placed cooling plates 11 between individual cells of the cell stack 24, adjacent to the pouch packaging sheet is depicted in FIG. 7.

To solve the problem presented in FIG. 7, in at least one embodiment depicted in FIGS. 8A and 8B, a pouch cell 500 with a frame 526 with thermal management features overcoming one or more disadvantages of the prior art is disclosed. For example, a thermal transfer device 502 may be placed inside each cell 500 to achieve better thermal contact with the electrodes and to eliminate the thermal conduction barriers through the cell pouch. The cooling feature, thermal transfer device 502, is thus in direct contact with the internals of the cell 500, as opposed to a prior art cooling device placed external to the cell 10. Such solution is not available to the prior art pouch cells as incorporation of an internal cooling plate would result in sealing issues. The disclosed frame 526 with flat sealing surfaces to complete cell enclosure allows for insertion of the thermal transfer device 502 into the frame 526 during manufacturing without interference with sealing.

Incorporation of the thermal transfer device 502 results in better heat transfer characteristics, greater integration as insertion of the thermal transfer device 502 within the frame 526 presents assembly of one device as opposed to the prior art assembly of three: a cell, a plate, a cell. Additionally, the rigidity of the cells 500 is increased.

Figures 9A, 9B:
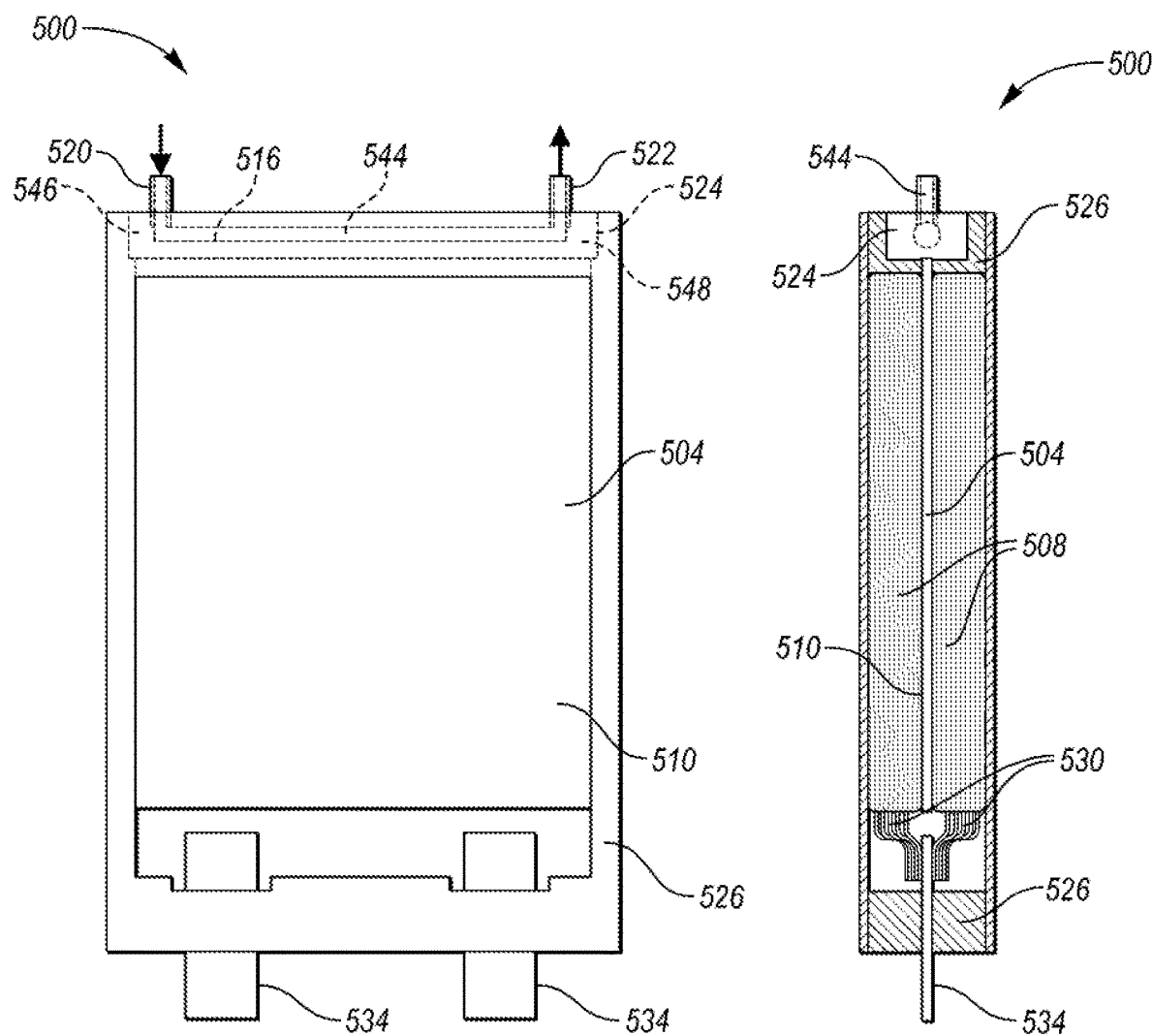
FIG. 9A shows a top view of an alternative example cell having a frame incorporating a thermal transfer device and a channel with a fluid in a header.
FIG. 9B shows a cross-sectional view of FIG. 9A.

The heat-transfer or thermal transfer device 502 may be a thermally conductive plate 504. The thermally conductive plate 504 has high thermal conductivity. The thermally conductive plate 504 may be made from metal such as aluminum, copper, stainless steel, or non-metal such as graphite or graphene. As is depicted in FIGS. 9A and 9B, the thermal transfer device 502 may provide an interface between the heat transfer device 502 and an external heat exchanger 506 to which the thermal transfer device 502 may be connected.

The thermal transfer device 502 may span the length of the frame 526. The thermal transfer device 502 may have at least one same dimension as the frame 526, for example the length or width. The thermal transfer device 502 may be thinner than the thickness of the frame 526 such that the thermal transfer device 502 may be incorporated into the frame 526 together with the electrode sandwich(es) 508. The electrode sandwich 508 includes at least one cathode, anode, and a separator. Each cathode and anode include current collectors 530 exposed tab portions 532 bonded to the cell terminals 534 incorporated into the frame structure 526, specifically to the interior portion of the terminals 535. In at least one embodiment, the thermal transfer device 502 may be inserted between two electrode sandwiches 508, as FIG. 9B depicts. The thermal transfer device 502 may thus have less than 50% thickness of the cell 500 or the frame 526. For example, the thickness of the thermal transfer device 502 may be 2, 5, 10, 15, 20, 25% of the cell 500 or frame 526 thickness.

By providing thermally conductive plate 504 internal to the cell 500 and in contact with the cell's electrolyte fluid, efficient thermal communication between the cell's interior and exterior cooling systems is created. Since the thermally conductive plate 504 is in a better thermal contact with the cell's electrode sandwiches 508 than a prior art cooling plate inserted between individual cells, a thinner thermally conductive plate 504 may be used compared to the cooling plates used in the prior art cooling systems for pouch cells.

To provide a reliable connection, the thermal transfer device 502 may be incorporated into the frame 526. For example, the thermal transfer device 502 may have a first portion 510 situated within the aperture 528, and a second portion 512 integrated into the frame 526. The second portion 512 may be located on the opposite side of the frame 526 than the battery terminals 534. Thus, both the terminals 534 and the thermal transfer device 502 are integral to the frame 526. Yet, the terminals 534 and the second portion 512 may be arranged on the same side of the frame 526. Thus, both the terminals 534 and the thermal transfer device 502 are integral to the frame 526. The second portion 512 may contain an exposed surface facing towards an exterior of the frame 526. For example, the exposed surface of the second portion 512 may be arranged to be in physical contact with an external heat exchanger 506.

The first portion 510 may be a thermally conductive plate 504. The second portion 512 may be a header 524. In one or more embodiments, the header 524 may include a channel 544 incorporated into the header 524, as is depicted in FIGS. 9A and 9B. The channel 544 may be insulated from the interior or first portion 510 of the cell 500. The channel 544 may include an inlet 520 and an outlet 522. The channel 544 may extend from a first side 546 of the frame to the second side 548 of the frame 526. The channel 544 may have uniform or non-uniform dimensions such as diameter. A fluid 516 having a cooling function may be arranged to flow from the inlet 520 to the outlet 522 to lower temperature of the cell 500. The fluid 516 may be a liquid coolant or air. The fluid 516 may be any fluid capable of cooling the cell 500 as the fluid 516 flows through the cell 500.

Figure 10A:
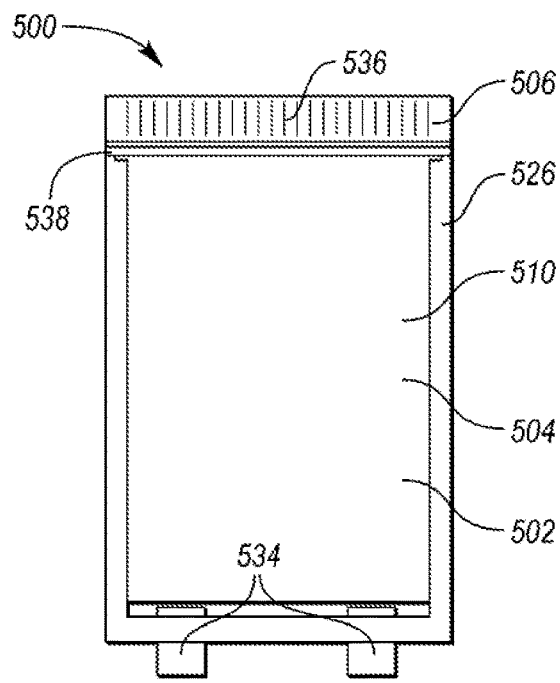
FIG. 10A shows a top view of an alternative example cell having a frame incorporating a thermal plate.
Figure 10B:
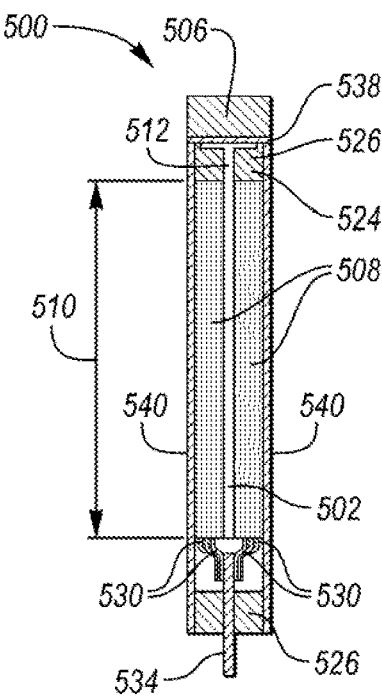
FIG. 10B shows a cross-sectional view of FIG. 10A.

Alternatively, the fluid 516 may be a liquid coolant capable of flowing through the second portion 512 to the cell exterior, where heat may be removed, either by air flow or through the use of a fluid circulation heat exchanger. In at least some embodiments, the cell exterior may include an external heat exchanger 506, a non-limiting example of which is depicted in FIGS. 10A and 10B. The external heat exchanger 506 may be in direct contact with the second portion 512. Alternatively, the external heat exchanger 506 may be isolated from the second portion 512 with an electrical insulator 538. The external heat exchanger 506 may include a portion arranged within the cell 500 and a portion extending through the cell packaging, sheet cover, or cell sealing surface 540 to the cell exterior, where a fluid connection may be provided.

The external heat exchanger 506 may be a convective heat exchanger, including convective cooling features such as fins 536 to allow for more efficient heat dissipation into flowing air. In other embodiments, the thermally conductive plate 504 may be connected to a header 524 incorporating liquid coolant that flows through the header 524 to an external heat exchanger 506.

Figure 11A:
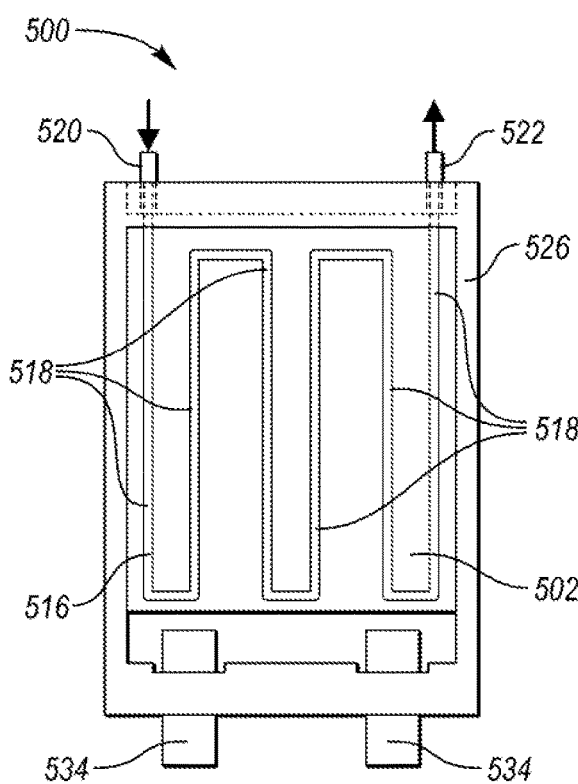
FIG. 11A shows a top view of a yet alternative example cell having a frame incorporating a thermal transfer device having a cooling channel.
Figure 11B:
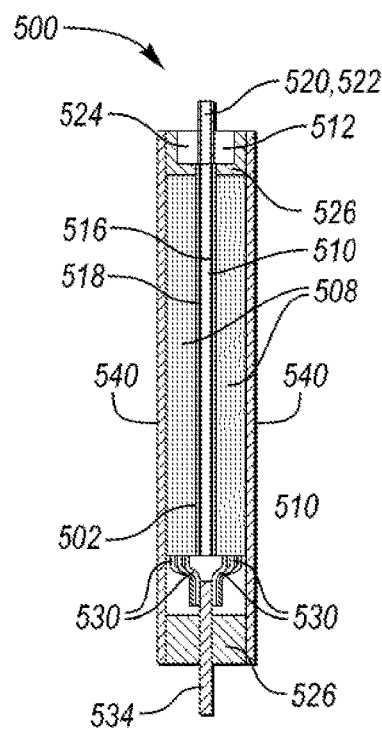
FIG. 11B shows a cross-sectional view of FIG. 11A.

In a yet another embodiment, the cell 500 may include a thermally conductive plate 504 having an internal cavity or hollow portion 518, depicted in FIGS. 11A and 11B. The cavity or hollow portion may be a channel, duct, canal, chamber, conduit, pipe, or passage 518. The channel 518 may zig-zag through the volume of the plate 504, forming a serpentine pathway. The channel 518 may have different shapes, as depicted, for example in FIGS. 12A and 12B. The channel 518 may have uniform or non-uniform dimensions such as diameter. The channel 518 accumulates heat throughout the pathway. The channel 518 may be a single channel or have one or more branches. The channel 518 may lead from an inlet 520 to an outlet 522. The inlet 520 and outlet 522 are integral to the frame 526. The inlet 520 and outlet 522 may be incorporated to the frame 526 on the opposite side than the terminals 534. Alternatively, the inlet 520 and outlet 522 may be located on either side of the frame, for example the bottom side 552 of the frame 526. The inlet 520 and outlet 522 may accommodate a fluid 516 supplied from the cell exterior 514. More than one channel 518 with more than one inlet 520 and outlet 522 is contemplated.

Figure 12A:
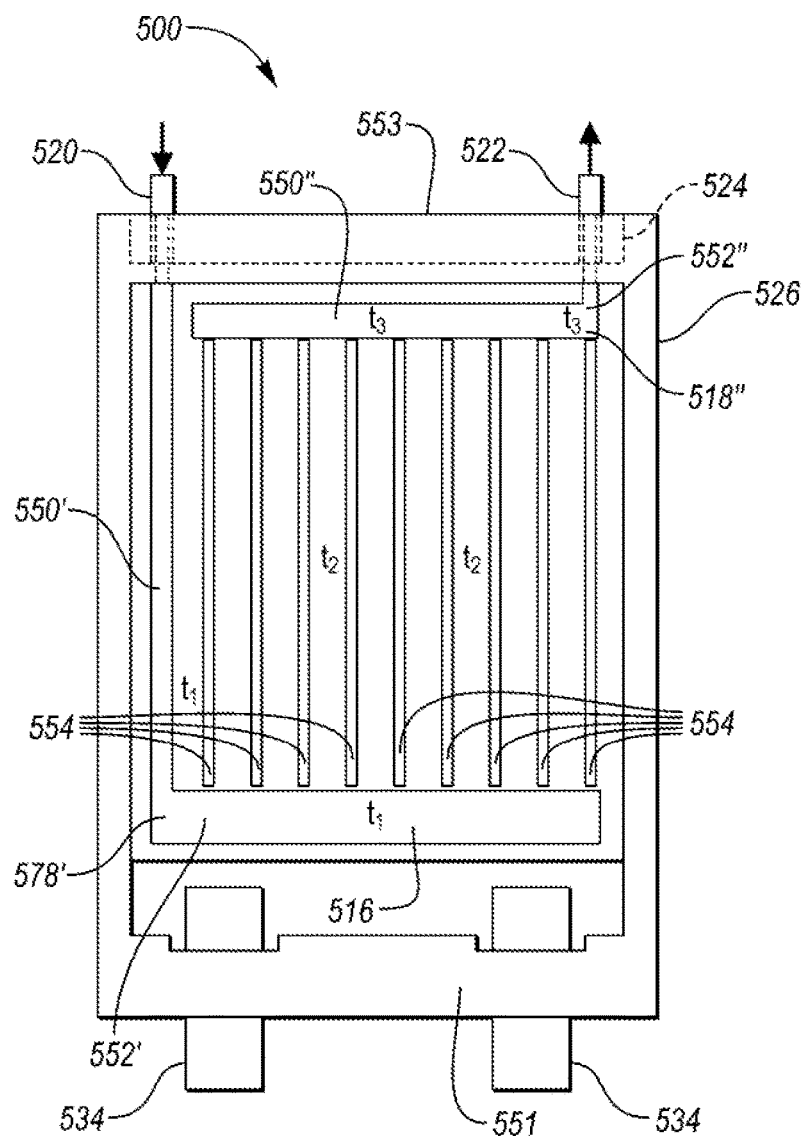
FIG. 12A shows a top view of a non-limiting example of a cell having a frame incorporating a thermal transfer device having a plurality of channels.
Figure 12B:
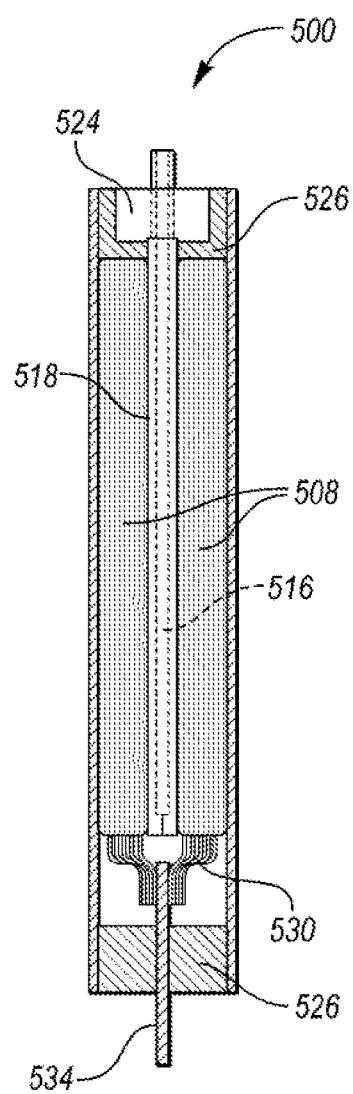
FIG. 12B shows a cross-sectional view of FIG. 12A.

In at least the embodiment of FIGS. 12A and 12B, the cell 500 may include a thermally conductive plate 504 having an internal cavity 518 having a parallel flow pattern of the fluid 516 flowing through the cavity 518. A plurality of channels 518 may connect an inlet 520 to the outlet 522. Alternatively, a single channel 518 may be present, having a plurality of branches 554. The branches 554 may be interconnected. At least one of the channels 518 or branches 554 may have different dimensions than the other channels 518 or branches 554. For example, a channel 518' extending in the direction of the terminals 534 may have a greater diameter than the remaining channels/branches such as the channels/branches located close to the header 524. In the non-limiting depicted example, a first channel 518' has a first portion 550' originating from the inlet 520, running perpendicular to the bottom edge 551 of the frame 526 and a second portion 552' running parallel with the bottom edge 550 of the frame 526. The frame 500 additionally includes a second channel 518" having a first portion 550" running parallel to the top edge 553 of the frame 526 and a second portion 552" running perpendicular to the top edge 553. The second portion 552" leads to the outlet 522. The first and second channels 518', 518" are interconnected via a plurality of branches 554. The number of branches 554 may vary. The plate 504 may include 1, 2, 3, 4, 5, 6, 7, 8, 9, 10, 15, 20, or more branches 554.

A benefit of the parallel flow pattern of the fluid lies in that the cooling provided by the fluid 516 may be uniform across the width of the cell 500. Additionally, as the fluid flows through the cavity 518, it cools the cell 500 which raises the fluid's temperature. The parallel flow pattern ensures that the fluid 516 having the lowest temperature t1 reaches the portion of the plate 504 which is located closest to the terminals 534, where the cell heat is primarily generated. As the fluid 516 travels towards the outlet 522 via the branches 544 and the second channel 518", temperature of the fluid rises such that $t1<t2<t3$.

Thus, the channels 518 arranged to enable parallel flow pattern of the fluid may ensure an efficient way of cooling the cell 500.

The fluid 516 may be air or a liquid capable of providing cooling to the cell 500. The fluid 516 may have a boiling point matching a desired upper temperature for operation of the cell 500. The fluid 516 may be sealed inside the internal cavity under pressure and form a thermal transfer device 502, where a substantial fraction of the heat conduction between the internal volume of the cell 500 and the header 524 incorporated in the frame 526 is via transport of vapor of the fluid 516. Example thermal transfer devices 502 working on this principle may be heat pipes, vapor chambers, or thermal siphons. Such thermal transfer device 502 may provide rapid heat transfer to an external portion of the cell 500 via evaporation and condensation of the fluid 516. To enhance the transport of the condensed liquid from the "cold-end" of the thermal transfer device 502 to the "warm-end," the internal surfaces of the cavity 518 may be intentionally roughened or coated with an inert material that has a high surface area to facilitate capillary action.

As FIGS. 13A and 13B show, the cell 500 may include an internal cavity or chamber 518, which extends throughout the entire or majority of the volume of the thermal transfer device 502. The thermal transfer device 502 may be a vapor cooling plate 504. The cavity 518 encompasses a first portion 510 as well as a second portion 512, which is incorporated into the frame 526. The first portion 510 may form a vapor chamber 541. The second portion 512 may form a condenser chamber 542. The thermal transfer device 502 may be a vapor cooling plate 504. The cavity 518 incorporates a vapor in equilibrium with its liquid. Heat generated during operation of the cell 500 may vaporize a portion of the liquid which is transported from the vapor chamber 541 to the condenser chamber 542, where contact with the cavity walls causes condensation of the vapor, releasing its heat of vaporization. The liquid is transported back to warm surfaces of the internal volume of the first portion 510 through action of gravity or by capillary action provided by a rough internal surface of the first portion 510, as was described above. The temperature differences of the fluid in the plate 504 are schematically depicted in FIG. 13A: $t1<t2<t3$. t1 represents the lowest temperature of the fluid in the condenser 542. As the fluid 516 is transported in the form of liquid towards the terminals 534, the fluid 516 has a greater temperature t2, which is lower than temperature t3 which the fluid reaches closest to the terminals 534.

In one or more embodiments, electrical insulation or an electrically insulating layer 538, a non-limiting example of which is depicted in FIGS. 9A and 9B, may be provided between the internal thermal transfer device 502 and external surfaces to limit the risk of inadvertent short circuits that could lead to discharge of the cell 500. In some embodiments, the surfaces of the thermal transfer device 502 in contact with the electrolyte or other internal contents of the cell 500 may be provided with an electrically insulating surface coating such as anodizing coating, polymer coating, coating formed from a paste such as aluminum oxide, silica-based paste, epoxy paste, or the like. For example, anodizing, dip coating, thermal spray, or other methods may be used to provide an insulating coating. Alternatively, the thermal transfer device 502 may feature a first portion having a surface that is positioned external to the contents of the cell 500 that acts as a thermal interface between the internal thermal transfer device 502 and a second portion that is entirely external to the cell 500, with an electrically insulating material positioned between the two surfaces. In this example, the interface material is substantially thermally conductive, but electrically insulating. The thermal interface materials may be pastes or coatings such as pastes of pyrolytic boron nitride particles or zinc oxide, or materials named above. The interface material may be a rigid solid sheet.

Additionally, a method of producing the battery cell, as described above, is disclosed. The frame of the battery cell may be molded, for example, using injection molding or formed by a similar method. A mold for the frame is created and filled with the material suitable for production of the frame, as was described above. The terminals may be incorporated into the frame structure as integral parts of the frame by placing the terminals into the mold such that the exterior portion extends beyond the periphery of the mold and at least a portion of the terminals protrudes into the mold. Similarly, other devices such as the thermal transfer device may be incorporated into the frame, having a portion extending into the cavity and a portion protruding into the mold. The mold is then filled with the molten material. The terminals, and/or a portion of the thermal transfer device, are thus over-molded which eliminates sealing issues around the terminals. The seal between the frame material and the terminals, and/or the portion of the thermal transfer device, is a hermetic seal.

In one or more embodiments, the exterior portion of each terminal which is intended to remain a bare metal exterior to the cell, may be isolated from the molten frame material. A second portion of the terminal may be isolated from the molten frame material to form a bare metal portion that is located inside the cell frame and which serves as a connection for the electrode current collectors. Thus, at both ends, portions of the terminals are separated from the mold to provide an area that is unmodified for electrical connections to the cell electrodes and/or the exterior electrical connections. Molding the terminals within the frame structure allows the terminals to be reliably fixed in the rigid frame structure that provides greater mechanical integrity, easier sealing, and enhanced protection against mechanical damage to the cell.

After cooling, the frame with integral terminals and/or other features may be removed from the mold.

The method may include forming the frame in such a way that the nature of the structure includes one or more passages which may serve as the channels described above. For example, the frame may be formed as a honeycomb structure with passages transverse to the faces, the top and bottom portions of the pouch or cell. The honeycomb structure may be configured so that a fluid may flow through the passages within a cell or within a stack of cells. In such an embodiment, aligned frames may form a continuous fluid path through a plurality of frames.

The frame may be formed from a plurality of sub-components which may be produced as separate pieces and interconnected to form the frame. For example, an upper half of the frame containing the terminals may be formed, and later connected to a separately formed lower half which does not contain the terminals. Alternatively, two separately formed portions may each include one terminal. Alternatively still, two halves of the frame, one forming the top of the frame and the second forming the bottom of the frame, may be formed separately. Once formed, the metal terminals may be inserted within terminal slots between the top and bottom halves of the frame and secured. The sub-components may interlock in such a way as to provide a hermetic seal between the adjacent sub-components of the frame, for example, through physical pressure. Alternatively, the sub-components may be connected by an adhesive, screws, bolts, the like, or a combination thereof.

Other features such as one or more openings, ports, vents, channels, electronic devices, thermal transfer device, or the like may be provided in the frame. For example, the mold may be created such that the features are formed when the material fills the mold, the features may be molded-in-place during manufacturing of the frame. Alternatively, the features may be formed and/or attached by welding, adhesion, or the like to the frame after the frame is molded and cooled.

The method may further include connecting the current collectors of the cathode and the anode to the terminals. The connection may be made by any suitable method that creates a low electrical resistance connection, such as by welding, through the use of conductive adhesives, by soldering, or by mechanical means. The current collectors may be attached to the interior portion of the terminals. Following the assembly of the stack of electrodes and separators, the stack may be inserted into the frame and the current collector tabs attached to the terminals. Subsequently, the faces of the frame, the top portion and the bottom portion, may be formed using a cell cover, as described above. The cell cover may be attached using any suitable sealing method such as heat sealing, welding (e.g. thermal or ultrasonic), through contact with a pressure sensitive adhesive applied to the frame or cover, through application of a curing adhesive such as epoxy or reactive vulcanization sealants, or any chemical or physical method of joining the materials that provides a hermetic seal or any combination thereof. The cell cover includes the frame with the anode, cathode, and separator such that at least a portion of the frame forms an internal portion of the cell. In at least one embodiment, the entire frame structure is located within the cell cover.

Once the cell includes the cell cover(s), an opening may be formed to serve as an electrolyte fill port if not already provided during fabrication of the frame. The cell is filled with a liquid electrolyte via the fill port. The port may be hermetically sealed. Alternatively, as was discussed above, the port may serve a different or an additional function such as a dedicated vent for release of access gas pressure from within the cell.

The method may also include assembling a stack of cells formed according to the method described above. A plurality of cells is arranged adjacent to each other, aligned, interlocked, or a combination thereof. In at least one embodiment, the frames may be assembled, aligned, interlocked, or a combination thereof after each frame receives the anode, separator, and cathode but prior to the frame receiving the cell cover. In such an embodiment, the aligned and/or interconnected frames are provided with a stack cover. The stack cover may be an equivalent to the cell cover described above but the cell cover is common to a plurality of the frames and encloses the plurality of the frames within the stack. For example, all of the frames may be included within a common cover.

If the thermal transfer device is incorporated into the frame, electrode sandwiches may be assembled from cathode(s), anode(s), and a separator(s) and positioned inside the frame, one electrode sandwich on each opposing side of the thermal transfer device. Electrode current collectors from each electrode sandwich may be welded to the cell terminals incorporated into the frame, providing electrical connections between the electrode sandwich and the terminals. After welding, the faces of the frame may be sealed with a seal cover or packaging, and the cell electrolyte added via the frame's port and subsequently sealed, as was discussed above.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A pouch battery cell comprising:
a rigid skeletal frame defining an aperture;
an anode, a separator, a cathode, and a thermal transfer device disposed within the aperture, the anode and the cathode each including a current collector with an exposed tab portion being bonded to a terminal and integrated into the frame, and the thermal transfer device integrated into the frame and partially extending to an exterior of the cell, wherein the thermal transfer device is a thermally conductive plate;
an external heat exchanger adjacent to the thermal transfer device, the external heat exchanger being arranged on an opposite side of the frame than the terminal; and
an electrically insulating layer being arranged between the external heat exchanger and the thermal transfer device.

2. The battery cell of claim 1, wherein the thermal transfer device comprises a first portion situated within the aperture and a second portion integrated into the frame and having an exposed surface facing towards an exterior of the frame.

3. The battery cell of claim 2, wherein the exposed surface of the second portion is arranged to be in physical contact with an external heat exchanger.

4. The battery cell of claim 1, wherein the heat exchanger includes a convective cooling feature.

5. A pouch battery cell comprising:
a rigid skeletal frame including a pair of terminals and defining an aperture;
first and second electrode sandwiches, each including an anode, a separator, a cathode, and a current collector, the first and second electrode sandwiches being arranged in the aperture such that the first and second electrode sandwiches are integrated into the frame via bonds between the pair of terminals and the current collectors;
a thermal transfer device arranged between the first and the second electrode sandwiches and being integrated into the frame and partially extending to an exterior of the cell;
a heat exchanger adjacent to the thermal transfer device and interfacing the first or second electrode sandwich; and
an electrically insulating layer being arranged between the heat exchanger and the thermal transfer device.

6. The battery cell of claim 5, wherein the thermal transfer device is a thermally conductive plate.

7. The battery cell of claim 5, wherein the thermal transfer device comprises a first portion situated within the aperture and a second portion integrated into the frame and having an exposed surface facing towards an exterior of the frame.

8. The battery cell of claim 7, wherein the exposed surface of the second portion is arranged to be in physical contact with an external heat exchanger.

9. The battery cell of claim 5, wherein the heat exchanger includes a convective cooling feature.

10. A pouch battery cell comprising:
a rigid skeletal frame including a pair of terminals and defining an aperture;

first and second electrode sandwiches, each including an anode, a separator, a cathode, and at least one current collector, the first and second electrode sandwiches being arranged in the aperture such that the anode and cathode of each electrode sandwich are integrated into the frame via bonds between the pair of terminals and the current collectors; and a thermal transfer device arranged in the aperture and integrated into the frame, the thermal transfer device including a hollow portion extending toward an exterior of the cell, the hollow portion comprising an internal chamber arranged in the aperture and connected to a condenser chamber that is arranged in the frame.

11. The battery cell of claim 10, wherein the hollow portion comprises a channel extending throughout the thermal transfer device, and wherein the channel is configured to transport a fluid from an inlet to an outlet.

12. The battery cell of claim 11, wherein the inlet and the outlet are incorporated into the frame.

13. The battery cell of claim 10, wherein the internal chamber includes a liquid and a vapor in equilibrium with the liquid.

\* \* \* \* \*